(No Model.) 2 Sheets—Sheet 1.
G. JULIAN.
MECHANISM FOR STARTING OR STOPPING POWER DRIVEN SHAFTS.
No. 540,062. Patented May 28, 1895.
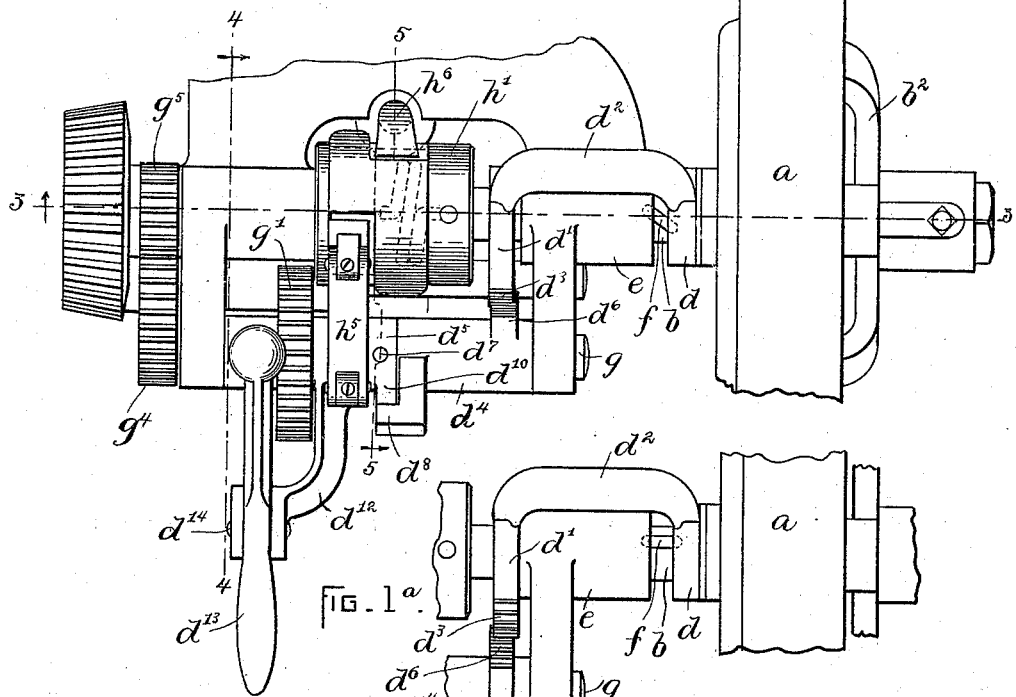
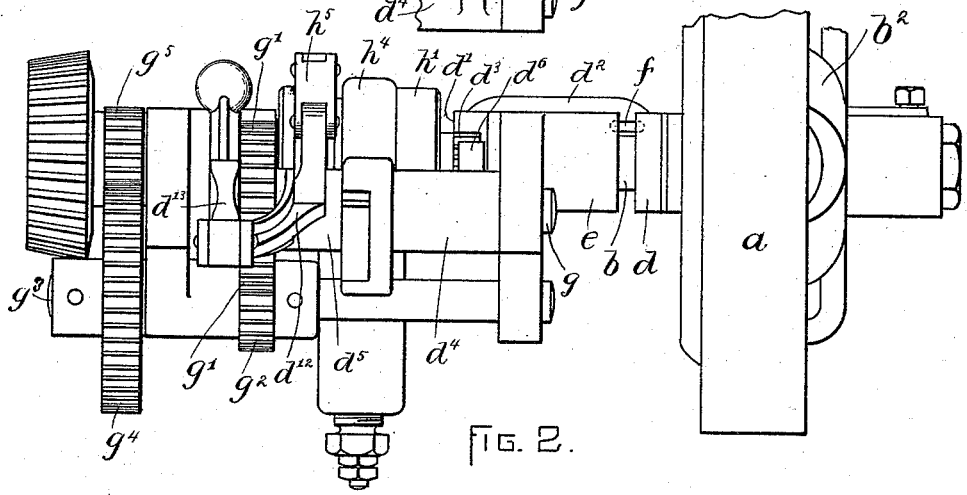
WITNESSES:
A. D. Harrison
Rollin Abell
INVENTOR:
G. Julian
by Knight Brown Quinby
Attys.

(No Model.) 2 Sheets—Sheet 2.
G. JULIAN.
MECHANISM FOR STARTING OR STOPPING POWER DRIVEN SHAFTS.
No. 540,062. Patented May 28, 1895.
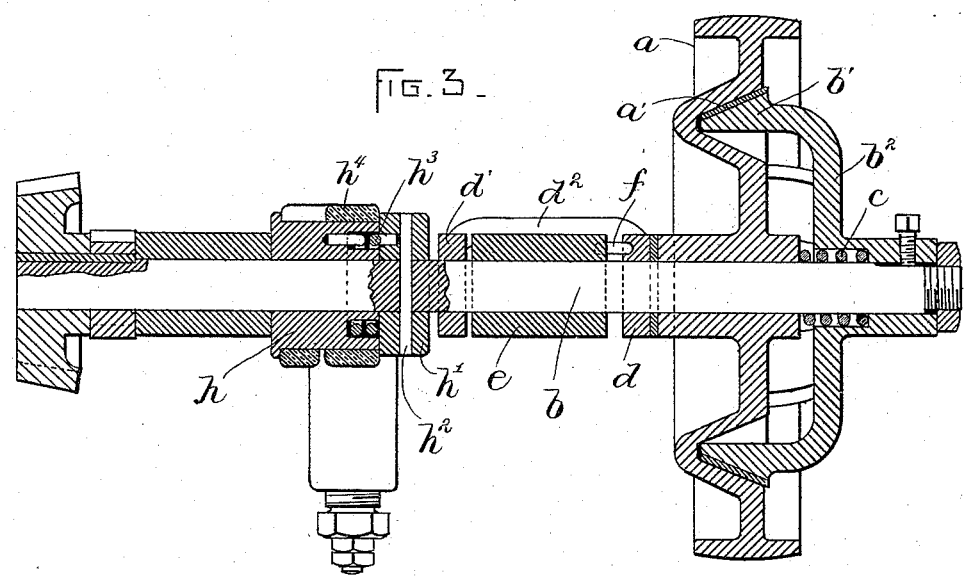
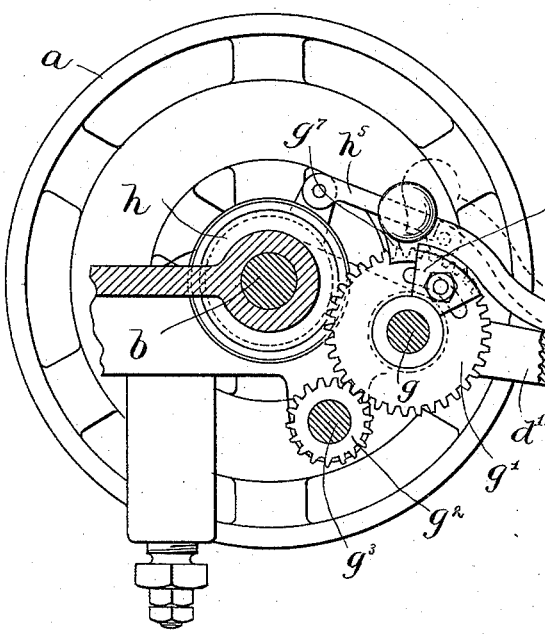
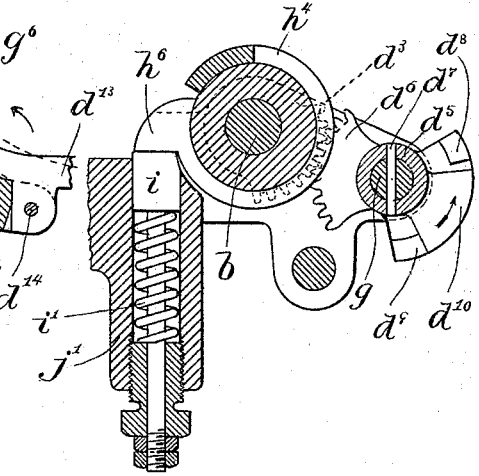
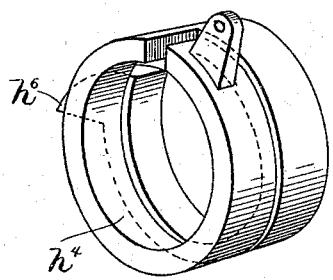
WITNESSES:
A. D. Harrison
Rollin Abell
INVENTOR:
G. Julian
by Knight Brown Quinby
Attys.
THE NORRIS PETERS CO., PHOTO-LITHO., WASHINGTON, D. C.

UNITED STATES PATENT OFFICE.

GIDEON JULIAN, OF BOSTON, ASSIGNOR, BY DIRECT AND MESNE ASSIGNMENTS, TO CHARLES F. BROWN, TRUSTEE, OF READING, MASSACHUSETTS.

MECHANISM FOR STARTING OR STOPPING POWER-DRIVEN SHAFTS.

SPECIFICATION forming part of Letters Patent No. 540,062, dated May 28, 1895.

Application filed January 10, 1895. Serial No. 534,435. (No model.)

*To all whom it may concern:*

Be it known that I, GIDEON JULIAN, of Boston, in the county of Suffolk and State of Massachusetts, have invented certain new and useful Improvements in Mechanism for Starting and Stopping Power-Driven Shafts, of which the following is a specification.

This invention relates to mechanism for connecting a loose driving pulley with and disconnecting or releasing it from the shaft to which it imparts motion, and for arresting the motion of the shaft after its disconnection from the pulley.

The invention has for its object, first, to provide simple and effective mechanism for operating a clutch which connects and disconnects the pulley and shaft, and, secondly, to provide improved means adapted to be operated by the clutch-operating mechanism, to arrest the motion of the shaft after it is disconnected from the pulley.

To these ends the invention consists in the novel features of construction and arrangement of parts which will be fully hereinafter described and particularly pointed out in the claims.

Of the accompanying drawings, forming a part of this application, Figure 1 represents a top plan view of a loose driving-pulley and a driven shaft provided with clutch-operating and shaft-arresting mechanism embodying my invention. Fig. 1$^a$ represents a view of parts of the mechanism shown in Fig. 1. Fig. 2 represents a side elevation of the mechanism shown in Fig. 1. Fig. 3 represents a section on line 3 3, Fig. 1. Fig. 4 represents a section on line 4 4, Fig. 1. Fig. 5 represents a section on line 5 5, Fig. 1. Fig. 6 represents a perspective view of the brake-shoe.

In the drawings, $a$ represents the driving pulley which is loose on the driven shaft, $b$, and is provided with a clutch member, $a'$, (Fig. 3,) adapted to engage a clutch member, $b'$, affixed to the shaft, the clutch member, $a'$, being preferably a beveled annular face formed on the web of the pulley, $a$, while the clutch member, $b'$, is a correspondingly beveled face on a spider, $b^2$, affixed to the shaft. The pulley, $a$, is movable lengthwise of the shaft for the purpose of engaging and separating the clutch members, and is normally pressed away from the clutch member, $b'$, by a spring, $c$.

For moving the pulley into contact with the clutch member, $b'$, I employ a movable abutment or collar, $d$, loosely mounted on the shaft between the hub of the pulley, $a$, and a fixed abutment or bearing, $e$, in which the shaft is journaled, and a strut, $f$, the ends of which are engaged with sockets formed in the said abutments. When the movable abutment, $d$, is turned on the shaft to the position shown in Fig. 1, the strut assumes an oblique position and permits the spring, $c$, to force the pulley away from the clutch member, $b'$. When the movable abutment is turned to the position shown in Fig. 1$^a$ the strut assumes a position parallel with the shaft, and forces the pulley against the clutch member, $b'$. The strut and movable abutment, therefore constitute a simple and effective means for engaging and disengaging the clutch members, the movable abutment permitting the rotation of the pulley, but not rotating with it.

Suitable means are provided whereby the operator may move the movable abutment, $d$, to its clutch-engaging position, and in connection therewith suitable automatic means are employed for moving said movable abutment to its clutch-releasing position at a given point in the rotation of the shaft. Said means as here shown, comprise a collar, $d'$, loosely mounted on the shaft, $b$, and attached by a yoke, $d^2$, to the movable abutment, $d$, said collar, $d'$, having a gear segment, $d^3$, (see dotted lines in Fig. 5,) a tubular shaft or sleeve, $d^4$, mounted to rock or rotate back and forth on a supporting shaft, $g$, said sleeve, $d^4$, having a gear segment, $d^6$, meshing with the segment, $d^3$, a collar, $d^5$, affixed by a pin, $d^7$, to the shaft, $g$, said collar having an arm, $d^{10}$, which has a limited play between ears or lugs, $d^8 d^9$, affixed to the sleeve, $d^4$, an arm, $d^{12}$, formed on or attached to the collar, $d^5$, and a lever or handle, $d^{13}$, pivoted at $d^{14}$ to said arm. When the operator desires to engage the clutch members he moves the arm, $d^{12}$, downwardly, thus partly rotating the collar, $d^5$, and through the latter and the arm, $d^{10}$, and stops, $d^8 d^9$, imparting a similar rotation to the sleeve, $d^4$, the latter being thus rotated in the direction required to cause it to rotate the movable abutment, $d$, to its clutch-engaging position, (see Fig. 1ª), through the segments, $d^6 d^3$, collar, $d'$, and yoke, $d^2$, the strut, $f$, holding the clutch members in engagement until the movable abutment, $d$, is turned back to the position shown in Fig. 1 by the action of the power transmitting mechanism next described. The said power transmitting mechanism as here shown for releasing the clutch members comprises the shaft, $g$, already referred to, a gear, $g'$, mounted loosely on said shaft, suitable connections between said gear and the shaft, $b$, through which the gear is continuously rotated when the shaft is in motion, (said connections including the gears, $g^2$ and $g^4$, affixed to a shaft, $g^3$, and a gear, $g^5$, affixed to the shaft, $b$,) a lug, $g^6$, affixed to the gear, $g'$, and a lug or tooth, $g^7$, formed on the lever, $d^{13}$. The described gearing is designed in the present case to rotate the gear, $g'$, at one-fifth of the speed of the shaft, $b$, although the proportion may be varied according to the nature of the machine. When the lug, $g^6$, on the gear, $g'$, reaches the tooth, $g^7$, it moves the lever, $d^{13}$, in the direction indicated by the arrow in Fig. 4. This movement of the lever, $d^{13}$, causes an upward movement of the arm, $d^{12}$, and a rotation of the collar, $d^5$, and sleeve, $d^4$, in the direction required to cause the latter to rotate the movable abutment, $d$, to its clutch-releasing position (Fig. 1). The clutch members are therefore separated after a predetermined period of operation of the machine. The downward movement of the lever, $d^{13}$, and arm, $d^{12}$, caused by the operator in engaging the clutch members as above described, raises the tooth, $g^7$, on said lever out of engagement with the lug, $g^6$, on the gear, the lever having an independent tilting motion on the arm, $d^{12}$, as indicated in dotted lines in Fig. 4, so that when the operator presses downwardly on the outer end of the lever the latter swings to raise the tooth from the lug, $g^6$, before it imparts downward movement to the arm, $d^{12}$.

In connection with the mechanism for disconnecting the clutch members, I provide an improved mechanism for arresting the rotation of the shaft, $b$, after the disconnection of the clutch members. Said arresting mechanism includes a sleeve, $h$, mounted loosely on the shaft, $b$, a collar, $h'$, affixed to the shaft, $b$, by a pin, $h^2$, at one end of the sleeve, $h$, a helical spring, $h^3$, attached at one end to the sleeve and at the other end to the collar, and constituting a flexible connection between the sleeve and the shaft, a metal brake-shoe or band, $h^4$, formed to encircle the sleeve, $h$, and adapted to be compressed thereon, said shoe being of helical form and supported at one end by the frame of the machine, and connected at the other end by a link, $h^5$, with the arm, $d^{12}$. When the said arm is moved as above described to disconnect the clutch members, the link, $h^5$, transmits motion from said arm to the shoe, $h^4$, and compresses the latter upon the sleeve, $h$, thus holding the latter from rotating. The shaft, $b$, continues to rotate (the sleeve being loose thereon) until the spring, $h^3$, is compressed to the limit of its resilience, and therefore arrests the rotation of the shaft, the spring acting as a gradual or elastic stop which arrests the rotation of the shaft without a violent shock or jar. The spring further acts by its recoil to give the shaft a partial backward rotation after the arrest of its forward rotation, a result that is useful when the mechanism of my invention is used in a sole-rounding machine in which the shaft, $b$, is geared to mechanism that impels a sole trimming knife along the edge of a sole shaped pattern, as shown in Letters Patent No. 528,128, the said backward rotation moving the knife backward a short distance from the point where it was stopped by the arrest of the forward rotation of the shaft. The knife is therefore enabled to pass by the point where it normally stops in order that there may be no liability of leaving a portion of the sole untrimmed at or about the end of the stroke.

I prefer to provide a yielding support for the end of the brake-shoe or band, $h^4$, that is sustained by the frame of the machine, said support being a stud, $i$, (Fig. 5,) vertically movable in a fixed socket, $j$, and normally held in the position shown by a spring, $i'$.

The brake-shoe or band, $h^4$, has a lug, $h^6$, which bears on the stud, $i$. When the shoe or band is compressed on the sleeve, $h$, the spring, $i'$, yields and supplements the action of the spring, $h^3$, both in yieldingly stopping the forward rotation of the shaft and in imparting a backward rotation thereto. In case the described yielding arrest and the partial backward rotation of the shaft, $b$, are not desired, one or both of the springs, $h^3$ and $i'$, may be omitted and the sleeve, $h$, rigidly attached to the shaft, $b$, so that the shoe or band, $h^4$, will act to stop the shaft when compressed by the operation of the clutch-releasing mechanism.

It will be seen that the clutch members may be disconnected and the shaft arrested by an upward movement of the lever, $d^{13}$, and arm, $d^{12}$, by the operator, so that the mechanism operated by the shaft, $b$, may be stopped at any point desired.

I claim—

1. The combination with a shaft, a loose driving pulley thereon, and clutch members on said shaft and pulley, of a fixed bearing or abutment adjacent to the pulley, a movable abutment between the fixed abutment and the pulley and having a bearing face adapted to exert pressure against the pulley without rotating therewith, a strut interposed between said fixed and movable abutments, said strut and movable abutment holding the clutch members in engagement with each other when the movable abutment is in one position and permitting their separation when said abutment is in another position, and means for partially rotating or turning the movable abutment from one position to the other.

2. The combination with a shaft, a loose driving pulley thereon, and clutch members on said shaft and pulley, of a fixed bearing or abutment adjacent to the pulley, a movable abutment between the fixed abutment and the pulley and having a bearing face adapted to exert pressure against the pulley without rotating therewith, a strut interposed between said fixed and movable abutments, said strut and movable abutment holding the clutch members in engagement with each other when the movable abutment is in one position and permitting their separation when said abutment is in another position, hand-controlled means for turning the movable abutment in one direction to cause the connection of the clutch members, and auotmatic means for causing the reversal of operation of the said hand-controlled means.

3. The combination with a shaft, a loose driving pulley thereon, and clutch members on said shaft and pulley, of an abutment, such as $(d)$, movable on said shaft, a fixed abutment adjacent to said movable abutment, a strut interposed between said abutments, a sleeve, such as $(d^4)$, operatively connected with said movable abutment, an arm, such as $(d^{12})$, operatively connected with the sleeve, $d^4$, a gear, $g'$, rotatively connected with the shaft, $b$, and provided with a projection, and a lever connected with said arm, $d^{12}$, and provided with a tooth adapted to engage said projection.

4. The combination with a shaft, a loose driving pulley thereon, and clutch members on said shaft and pulley, of clutch-operating devices comprising an arm, such as $d^{12}$, and connections between said arm and one of the clutch members through which opposite movements of the arm are caused to connect and disconnect the clutch members, a brake adapted to be applied to the shaft, a connection between said brake and the arm $d^{12}$, power-transmitting mechanism connected with the shaft and including a gear having a projection $g^4$, and a lever $d^{13}$ pivoted to the arm $d^{12}$ and having a lug or tooth $g^7$ adapted to engage the projection $g^4$, said lever being movable in one direction by hand to connect the clutch members and cause the rotation of the shaft and in the opposite direction by power transmitted from the shaft, to disconnect the clutch members and apply the brake.

5. The combination with a shaft, a loose driving pulley thereon, and clutch members on said shaft and pulley, of a clutch-operating mechanism including an arm, such as $d^{12}$, and connecting devices between said arm and the movable clutch member through which opposite movements of said arm are caused to connect and disconnect the clutch members, the arm being movable by hand to its clutch-connecting position, a brake adapted to be applied to the shaft, a connection between said brake and arm through which the clutch-disconnecting movement of the arm is caused to apply the brake, and power-transmitting mechanism operated by the rotation of the shaft to give the said arm its clutch disconnecting and brake applying movement.

6. The combination with a shaft, a loose driving pulley thereon, and clutch members on said shaft and pulley, of a clutch-operating mechanism, a shaft-arresting mechanism, and connections between the latter and the clutch-operating mechanism whereby the arresting mechanism is made operative when the clutch mechanism is operated to disconnect the clutch members, said brake mechanism including a spring which is compressed by the operation of arresting the shaft, and gives the shaft a backward movement after its arrest.

7. The combination with a shaft, of an arresting mechanism comprising a loose sleeve on the shaft, a spring connecting the sleeve with the shaft, a brake-shoe on the sleeve, and means for pressing said shoe against the periphery of the sleeve to lock the latter and cause the spring to yieldingly arrest the shaft.

8. The combination with a shaft, of an arresting mechanism comprising a loose sleeve on the shaft, a spring connecting the sleeve with the shaft, a brake band or shoe formed to encircle the sleeve, a yielding support for one end of said shoe, and means for exerting pressure on the other end of the shoe to compress it upon the sleeve.

In testimony whereof I have signed my name to this specification, in the presence of two subscribing witnesses, this 3d day of January, A. D. 1895.

GIDEON JULIAN.

Witnesses:
C. F. BROWN,
CHARLES S. HULL.